United States Patent
Minemura et al.

(10) Patent No.: US 7,746,757 B2
(45) Date of Patent: Jun. 29, 2010

(54) OPTICAL DISC MEDIUM AND OPTICAL DISC DEVICE

(75) Inventors: Hiroyuki Minemura, Kokubunji (JP); Toshimichi Shintani, Kodaira (JP); Yumiko Anzai, Ome (JP)

(73) Assignee: Hitachi, Ltd., Tokyo (JP)

( * ) Notice: Subject to any disclaimer, the term of this patent is extended or adjusted under 35 U.S.C. 154(b) by 631 days.

(21) Appl. No.: 11/704,963

(22) Filed: Feb. 12, 2007

(65) Prior Publication Data

US 2008/0159119 A1 Jul. 3, 2008

(30) Foreign Application Priority Data

Dec. 28, 2006 (JP) ............... 2006-356034

(51) Int. Cl.
*G11B 3/70* (2006.01)
(52) U.S. Cl. ..................... 369/277; 369/278
(58) Field of Classification Search ............ 369/278
See application file for complete search history.

(56) References Cited

U.S. PATENT DOCUMENTS

| | | | | |
|---|---|---|---|---|
| 2002/0159347 A1* | 10/2002 | Sasaki et al. | ......... | 369/44.37 |
| 2002/0192423 A1* | 12/2002 | Arioka et al. | ......... | 428/64.4 |
| 2004/0264021 A1* | 12/2004 | Lim et al. | ......... | 360/31 |
| 2005/0106508 A1 | 5/2005 | Shintani et al. | | |
| 2005/0254408 A1* | 11/2005 | Hwang et al. | ......... | 369/275.1 |
| 2006/0072434 A1 | 4/2006 | Shintani et al. | | |
| 2006/0262711 A1 | 11/2006 | Shintani et al. | | |
| 2006/0275712 A1 | 12/2006 | Anzai et al. | | |
| 2007/0009291 A1 | 1/2007 | Anzai et al. | | |
| 2007/0206463 A1* | 9/2007 | Kuroda | ......... | 369/47.1 |
| 2008/0031123 A1* | 2/2008 | Ho et al. | ......... | 369/275.1 |
| 2008/0285431 A1* | 11/2008 | Minemura et al. | ......... | 369/284 |

FOREIGN PATENT DOCUMENTS

| | | |
|---|---|---|
| JP | 2005-100526 | 4/2005 |
| JP | 2006-107588 | 4/2006 |
| JP | 2006-323965 | 11/2006 |
| JP | 2006-338787 | 12/2006 |

* cited by examiner

*Primary Examiner*—Joseph H Feild
*Assistant Examiner*—Ifedayo Iluyomade
(74) *Attorney, Agent, or Firm*—Antonelli, Terry, Stout & Kraus, LLP.

(57) ABSTRACT

Provided are a medium structure which allows track narrowing onto a three-dimensional pit selection type disc, and its corresponding optical disc device. Multiple data pit strings are formed between track guide grooves, and a phase-change recording film is formed only in the data pit strings. Thereby, a disc configuration is achieved. Reflectivity and a phase of each of a space portion and a mark portion are appropriately set. Thereby, normal resolution signal cancel is implemented to prevent deterioration in data crosstalk and a push-pull signal. An optical disc medium of the present invention is supported by an optical disc device having a configuration in which a signal is selected from a push-pull signal of a main beam and push-pull signals of sub-beams to read out wobble address information.

9 Claims, 18 Drawing Sheets

Space

Mark (pit)

Step-1

Step-2

Step-3

OPTICAL DISC MEDIUM AND OPTICAL DISC DEVICE

CLAIM OF PRIORITY

The present application claims priority from Japanese application JP 2006-356034 filed on Dec. 28, 2006, the content of which is hereby incorporated by reference into this application.

BACKGROUND OF THE INVENTION

1. Field of the Invention

The present invention relates to an optical disc medium which forms a recording mark having a different physical characteristic from that of the other portion, on a recording medium to store information, and relates to an optical disc device which reads information from the medium.

2. Description of the Related Art

Optical disc media include various media, such as a CD-R/RW, a DVD-RAM, a DVD±R/RW, a Blu-ray Disc (hereinafter referred to as a BD), and a HD DVD. Such optical disc media including one with two data layers have been widely used. What is termed as a DVD super multi-drive, which is provided for writing/reading on/from CD-R/RW, DVD-RAM and DVD±R/RW, has widely available as the corresponding optical disc device. A high-performance drive, which is provided to a BD and a HD DVD, is considered to be widely available in the future.

Super resolution techniques and SIL (Solid Immersion Lens) for next-generation large-capacity optical discs are proposed, and one of the super resolution techniques is described in Japanese Patent Application Laid-open No. 2006-107588. Specifically, a phase-change recording film, which changes its optical characteristics when it melts, is buried in pits to conduct super resolution reading. In addition, recording marks are spatially separated from each other to reduce thermal interference between the recording marks and fluctuation of a super resolution region. The aforementioned configuration makes it possible to improve linear density and track density at the same time. As a result, storage capacity of the optical disc can be largely increased. Furthermore, light transmittance of the region between data pits is increased to allow an increase in an average light transmittance of a data surface. Thus, efficiency in light utilization is high, and this is advantageous for a multi-layering process. This type of pit selection is hereinafter called as a three-dimensional pit selection type. As means for burying the recording film in the pits, it is possible to use a phase-change etching method (a method using a difference in etching speed between liquid crystal and amorphous) as described in Japanese Patent Application Laid-open No. 2005-100526, and a physical polishing method such as CMP (Chemical Mechanical Polishing).

SUMMARY OF THE INVENTION

A typical optical disc tracking control method includes a push-pull method using diffracted light in guide grooves and a DPD (Differential Phase Detection) method using a phase difference between readout signals of a pit edge portion. The push-pull method is used in a record type optical disc, and a DPP (differential Push-Pull) method for suppressing offset caused by eccentricity of the optical disc medium is widely and generally used. The DPD method is widely used as a method of tracking a ROM optical disc on which a data pit string is formed. The track pitch of the conventional optical disc is roughly about a half of a diameter of an optical spot. If the track pitch is reduced, amplitude of a track error signal decreases in the pull-push method, and quality of the track error signal deteriorates due to an influence of crosstalk with an adjacent track in the DPD method. For this reason, stable tracking control cannot be implemented in either case. Moreover, in the DPD method, if the recording mark (pit) is reduced, a phase difference occurred at the edge portion decreases. As a result, a stable track error signal cannot be obtained. In Japanese Patent Application Laid-open No. 2006-107588, an optical head with a 0.85 numerical aperture and a semiconductor laser as a light source with a wavelength of 405 nm are used to perform tracking control for a three-dimensional pit selection type disc with a track pitch of 0.24 μm in the same DPD method as that used in the normal ROM. Because the optical head is compatible with BD, track narrowing where the track pitch is narrowed 1.5 times as compared with the normal track pitch of 0.32 μm is achieved. However, the above publication does not describe stability of the tracking control. For the aforementioned reason, it is considered to be difficult to further narrow the track.

An object of the present invention is to provide a medium structure which solves the aforementioned problems, and which is capable of narrowing tracks on a three-dimensional pit selection type disc. Another object of the present invention is to provide its corresponding optical disc device.

An optical disc medium of the present invention includes a track guide groove and a data track formed in a region between two adjacent track guide grooves. A data pit is formed on the data track, and material having an optical characteristic, which changes according to power of an irradiating light beam, is buried only in the data pit. In the region between two adjacent track guide grooves, multiple data tracks can be formed. Here, when power of an irradiating light beam is a first power, the amount of reflected light from the data pit is substantially equal to the amount of reflected light in a region between data pits. When power of the irradiating light beam is a second power which is higher than the first power, the amount of reflected light from the data pit is different from the amount of reflected light in the region between the data pits.

Accordingly, it is possible to solve the problems of the present invention, and to provide the optical disc medium which implements stable track control while increasing track density of the three-dimensional pit selection type disc. The corresponding optical disc device basically performs tracking control using the conventional push-pull or a DPP type track error signal. Meanwhile, means for applying the amount of offset, which corresponds to a designated data track, to the track error signal needs to be provided. The amount of offset is applied in response to the presence of multiple data tracks between the guide grooves.

The optical disc medium and optical disc device of the present invention makes it possible to provide a large-capacity optical disc system which makes use of a super resolution effect.

DETAILED DESCRIPTION OF THE PREFERRED EMBODIMENTS

In order to allow track narrowing on a three-dimensional pit selection type disc, it suffices that guide grooves are formed at the same distances as those in the case of the conventional optical disc such as BD, and that multiple data tracks are formed in a region between two guide grooves. With the aforementioned disc configuration, tracking control can be stably performed by the normal push-pull method or DPP method, and the multiple data tracks are formed between the guide grooves. Thereby, track density of data can be improved. Problems of the method and means for solving the problems will be described below.

The problems which occur when implementing an optical disc medium of the present invention are as follows: (1) reduction in crosstalk between data tracks caused by narrowing data tracks; and (2) provision of a specific disc configuration and a disc manufacturing method. Means for solving the aforementioned problems will be described below.

(1) Reduction in Crosstalk Between Data Tracks Caused by Narrowing Data Tracks

In the three-dimensional pit selection type disc, a change in an optical characteristic caused when a phase-change recording film buried in pits melts is used to perform super resolution reading of a mark smaller than an optical resolution. On the other hand, in a case where there is a mark larger than the optical resolution, the same signal as in the case of the normal optical disc can be obtained. The aforementioned operations are hereinafter referred to as super resolution reading and normal resolution reading, respectively. In a case where the data track is narrowed, the track during readout is in a state of super resolution reading since optical energy thereof is high, while an adjacent track is in a state of normal resolution reading since optical energy thereof is low. A normal resolution readout signal on an adjacent data track is leaked into a super resolution readout signal as crosstalk on the relevant track. For this reason, if the normal resolution readout signal is large, quality of the readout signal deteriorates. In order to solve this problem, the normal resolution readout signal may be decreased as much as possible, preferably to zero. The technique which decreases the normal resolution readout signal to reduce crosstalk into the super resolution readout signal is hereinafter referred to as normal resolution cancel technique.

Figure 2:
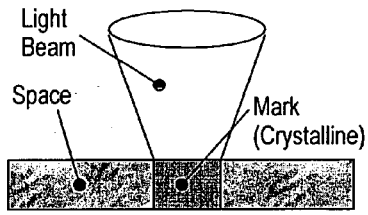
FIG. 2 is a conceptual view of normal resolution cancel.

FIG. 2 shows a concept of normal resolution cancel, and two types thereof will be given. It is herein supposed that reflectivity of a space portion is Rs, reflectivity of a mark in a crystalline state is Rc and reflectivity of a mark in a molten state is Rm. A configuration of type 1 is Rs=Rc. This allows amplitude (Rc−Rs) of the normal resolution readout signal to be zero, and makes it possible to ensure amplitude (Rm−Rs) of the super resolution readout signal. A configuration of type 2 uses a physical difference in a physical step between the pit and the space and an optical phase difference depending on a film configuration of each of the pit and space. At this time, Rs<Rc is established, and the amount of light diffracted outside an aperture of an objective lens at the pit portion is made equal to the amount of light corresponding to a difference in reflectivity (Rc−Rs). Thereby, amplitude (Rc−Rs) of the normal resolution readout signal can be zero. At the time of super resolution reading, the reflectivity of the mark changes, and balance between both of the aforementioned amounts of light is lost. This result is detected as signal amplitude.

Figure 3:
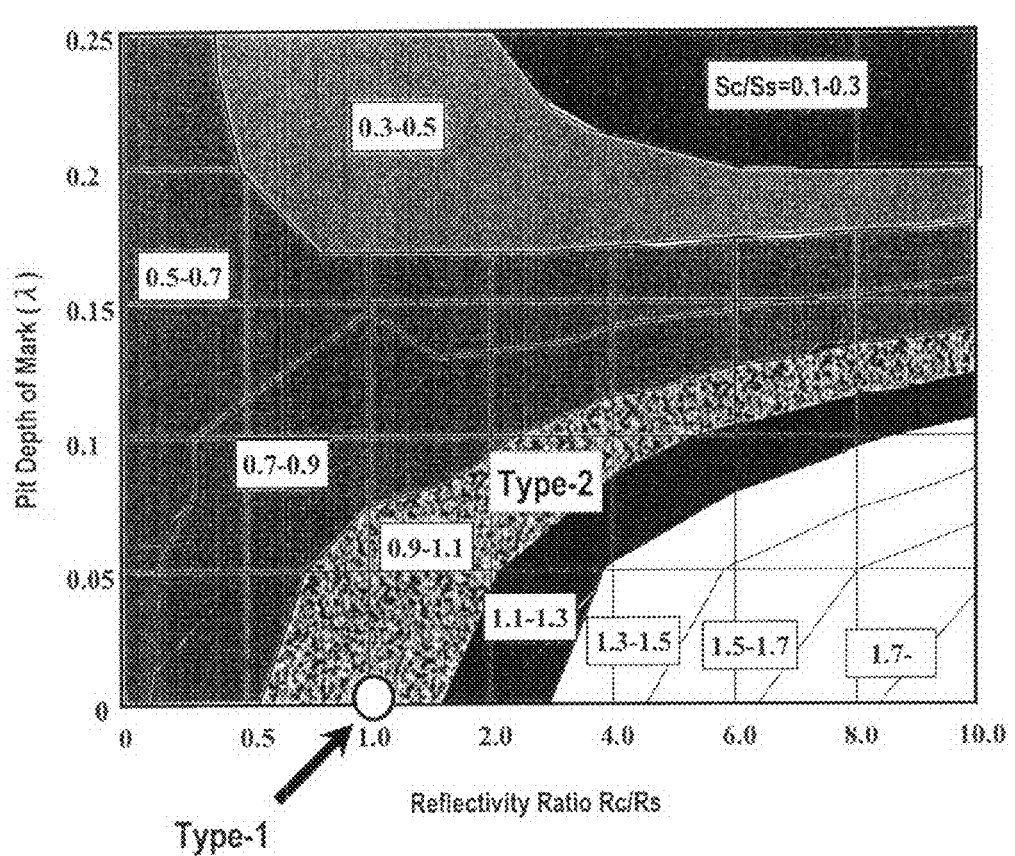
FIG. 3 is a diagram illustrating a relationship among amplitude of a normal resolution signal, reflectivity of a mark and an effective pit depth.

FIG. 3 is a view illustrating a relationship among amplitude of a normal resolution signal, reflectivity of a mark and an effective pit depth (mark optical phase difference/2). Here, a result of the following calculation is shown. Specifically, the calculation is performed using a linear diffraction simulator based on Hopkins method at the time when a wavelength of a light source is 405 nm, a numerical aperture of an objective lens is 0.85, a width of a mark is 0.16 μm and a length of the mark is 0.60 μm. In FIG. 3, Sc and Ss each indicate signal intensity of the mark (crystalline state) and that of the space, respectively, and each show a calculation result including a diffraction effect. A condition for normal distribution cancel is Sc=Ss. A condition for type 1 is one point where a reflectivity ratio Rc/Rs=1 and a depth of an effective pit=0λ, while in the case of type 2, a combination of the reflectivity ratio Rc/Rs and a depth of an effective pit is expanded in a wide region as can be seen in FIG. 3. The above result shows that type 2 has a larger degree of freedom in the disc configuration so that manufacturing thereof is made easy.

Figure 4:
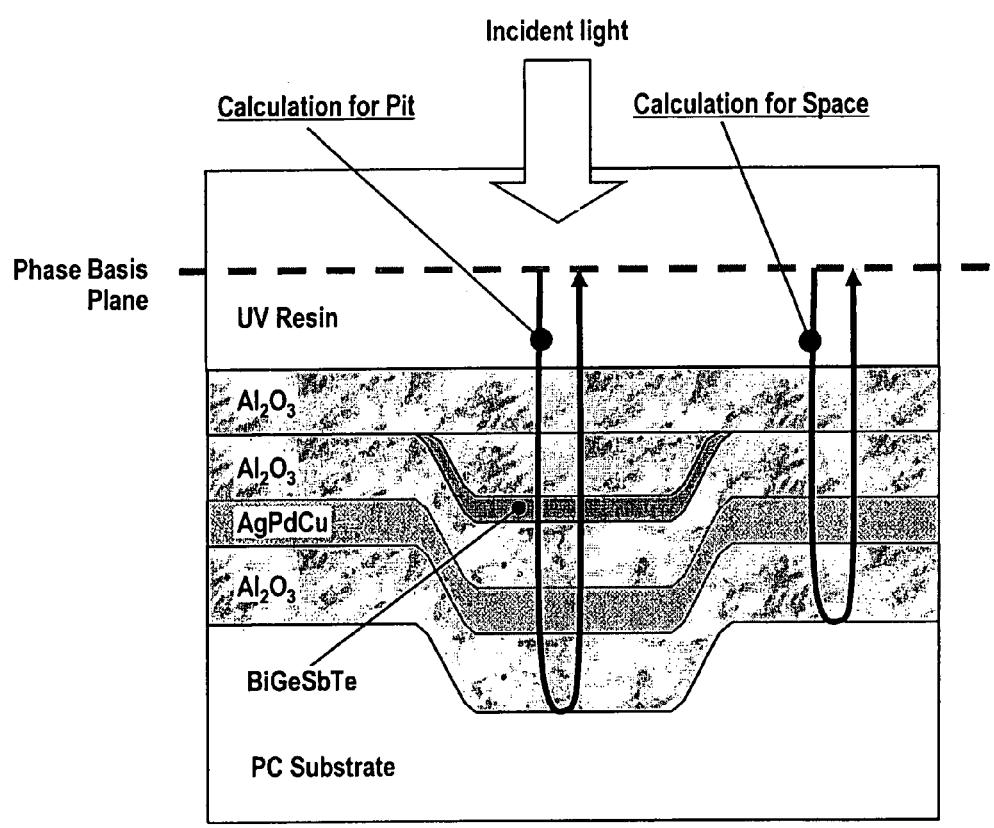
FIG. 4 is a model view of an optical calculation of an optical disc medium of the present invention.

In order to set the disc structure, reflectivity and phase of each of the mark portion and space portion need to be calculated. As compared with the conventional method, a strategy is required to calculate the reflectivity and phase of the mark portion of the three-dimensional pit selection type disc. FIG. 4 shows a model of an optical calculation of a three-dimensional pit selection type disc processed by the CMP. Here, a normal multilayer interference calculation method using a characteristic matrix is used. A reference surface for phase calculation is virtually formed in a cover layer (UV resin according to BD optical system in FIG. 4) on an incident light side, and interference calculation using a character matrix is performed according to a film configuration of each of the pit portion and space portion to obtain complex amplitude reflectivity. Thereby, reflectivity of the pit portion, reflectivity of the space portion, and effective pit depth (optical phase) of the pit portion are calculated. This makes it possible to calculate the reflectivity and phase corresponding to the physical depth of the pit formed on the substrate and to the film configuration of each of the mark and space. The result is input to the aforementioned linear diffraction simulator. Thereby, a readout signal can be calculated. The disc configuration in FIG. 4 is a basic configuration in the following description. A PC substrate having a shortest pit length of 0.15 μm and a pit length of 68 nm is used as a substrate, an AgPdCu alloy thin film is used as a reflective film, a BiGeSbTe alloy thin film is used as a recording film, and an $Al_2O_3$ thin film is used as a protective film.

Figure 5:
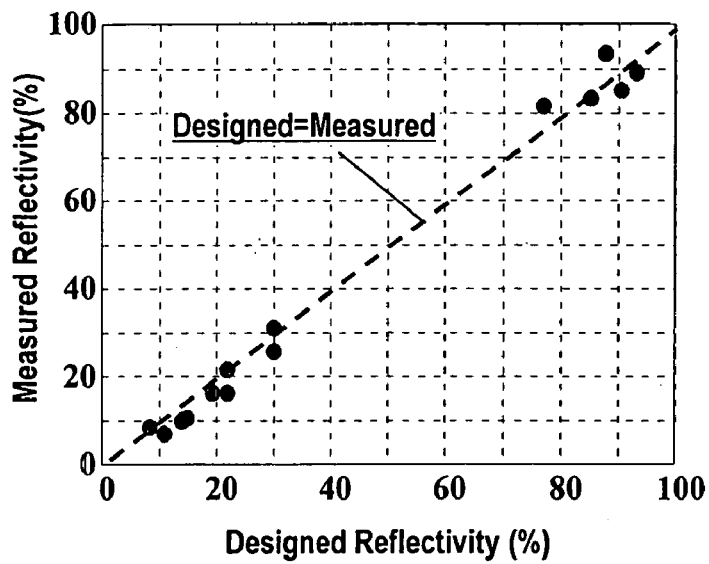
FIGS. 5A and 5B are graphs illustrating a designed result and a measured result of reflectivity of a space portion and a mark portion of a prototype disc.
Figure 5:
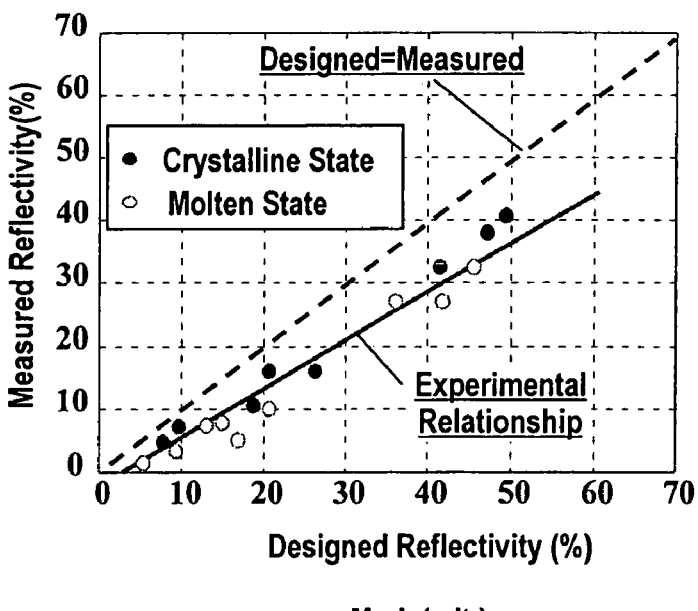

FIGS. 5A and 5B are graphs illustrating a designed result and a measured result of reflectivity of a space portion and of a mark portion of a prototype disc. An optical head used in an experiment has a light source wavelength λ of 405 nm, and an objective lens with a numerical aperture NA of 0.85, and $1/e^2$ diameter (λ/NA) of a light-condensing spot is about 476 nm. As discs used in the experiment, the following discs are is prepared. Specifically, each of the plurality of discs has an AgPdCu alloy thin film with a thickness ranging from 10 to 200 nm, a BiGeSbTe alloy thin film with a thickness ranging from 10 to 30 nm, and an $Al_2O_3$ thin film with a thickness ranging from 10 to 90 nm. A designed value and a measured value of the reflectivity of the space portion match each other well, the measured value the reflectivity of a pit portion is smaller than the designed value thereof. The reason thereof is considered to be that a difference is caused between the aforementioned calculation method and the method of the multilayer interference calculation model where a flat multilayer which expands endlessly is modeled due to the size of the pit smaller than the wavelength. It is possible to confirm that the aforementioned calculation method can sufficiently implement a design of the film configuration, and that addition of correction by an experiment allows amplitude of the normal resolution signal to be close to zero. This result reveals that amplitude of the super resolution signal, which is about 10% of the reflectivity of space portion, can be obtained.

Descriptions will be provided below for a result of calculation of an electromagnetic field by FDTP (Finite Differential Time Domain). Here, descriptions are centered on a result of a normal resolution cancel structure of type 1 for simplicity of calculation. However, in a normal resolution cancel structure of type 2, the calculation method is basically the same as that used for the structure of type 1.

Figure 6:
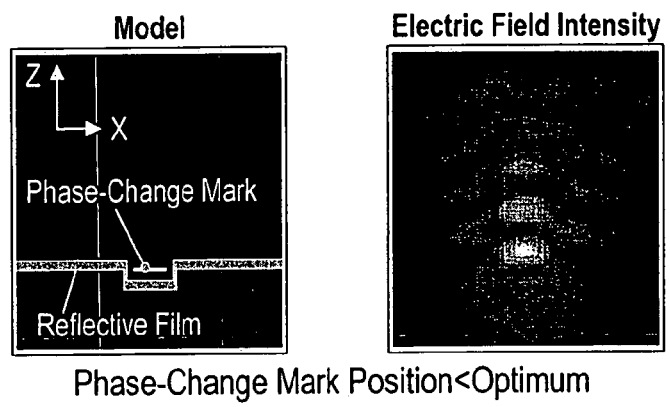
FIGS. 6A to 6C are views illustrating a result of calculation of an electromagnetic field by FDTP.
Figure 6:
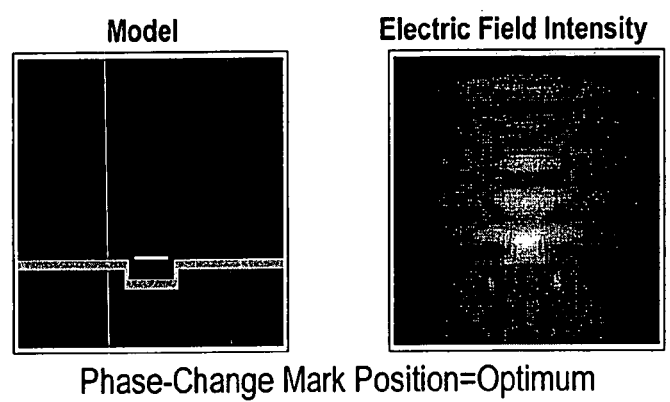
Figure 6:
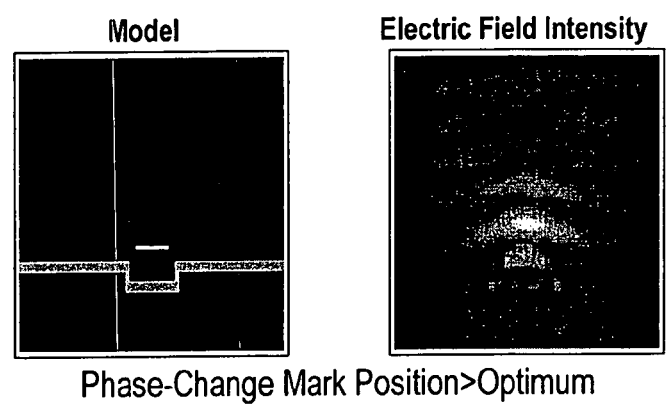

FIGS. 6A to 6C are views illustrating examples of results obtained by carrying out calculation of an electromagnetic field by FDTP. In this event, the following state is shown. Specifically, a phase-change recording film is formed in a pit coated with a reflective film, an electric filed distribution changes depending on a position of its film thickness direction (Z direction in FIGS. 6A to 6C). FIG. 6B is a condition appropriate for the configuration of type 1 where diffraction by the mark reaches the minimum, and where reflectivity of the mark and that of the space are equal to each other. At this time, a reflective film of the space portion and a recording film in the pit are placed at roughly the same position in a film thickness direction. This is the main point of the normal resolution cancel structure of type 1.

Figure 7:
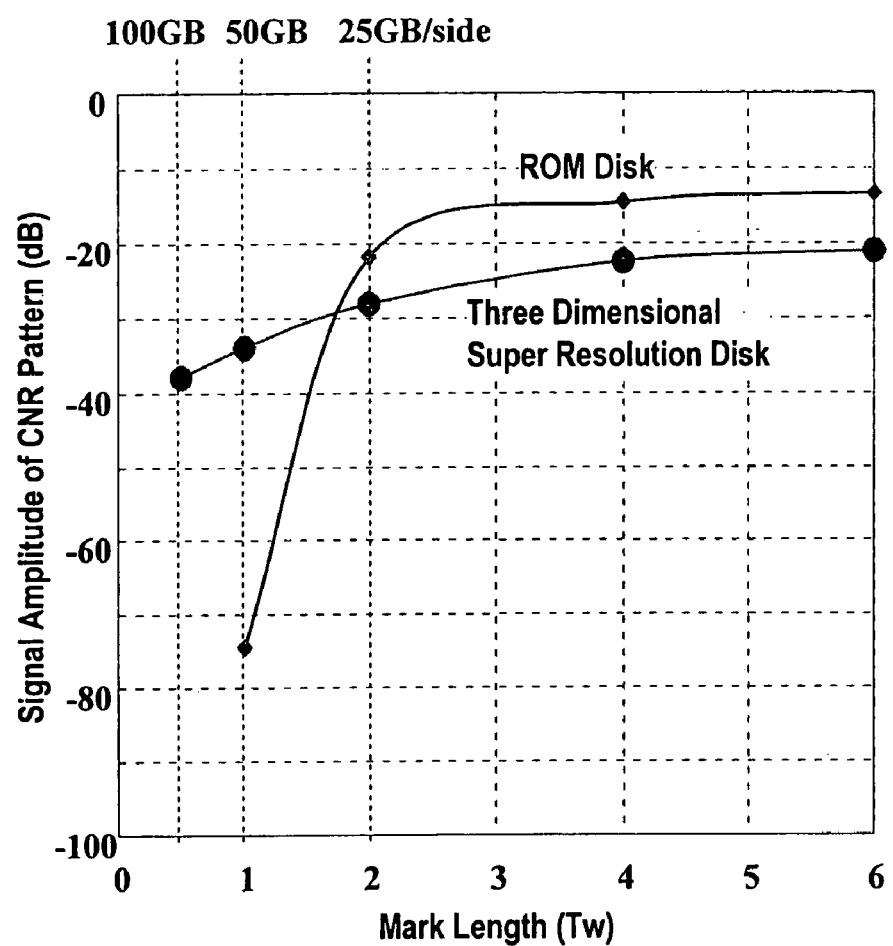
FIG. 7 is a graph illustrating a result of calculation of a relationship between a mark length of a repetitive signal and signal amplitude thereof.

FIG. 7 is a graph illustrating a result obtained by calculating, by FDTD, a relationship between a mark length of a repetitive signal and signal amplitude thereof. Here, a result obtained from the model in FIG. 6B is shown. As can be seen in FIG. 7, it is revealed that a three-dimensional pit selection disc with a normal resolution cancel structure can obtain sufficient signal amplitude even under a condition of 100 GB where linear density of BD is increased fourfold as compared with a normal ROM disc.

(2) Provision of a Specific Disc Configuration and a Disc Manufacturing Method

A configuration of a specific disc will be considered with CMP processing as its prerequisite. When the disc undergoes the CMP processing, it is possible to process a disc surface flat. The use of normal resolution cancel structure as described above allows density of the data track to be increased. The track guide grooves may be formed in such a way that a push-pull signal with a sufficient size can be obtained. However, if a phase-change recording film, which responds to super resolution, is present in the track guide grooves, a problem arises, in which the push-pull signal itself is made small by a normal resolution cancel effect.

Figure 8:
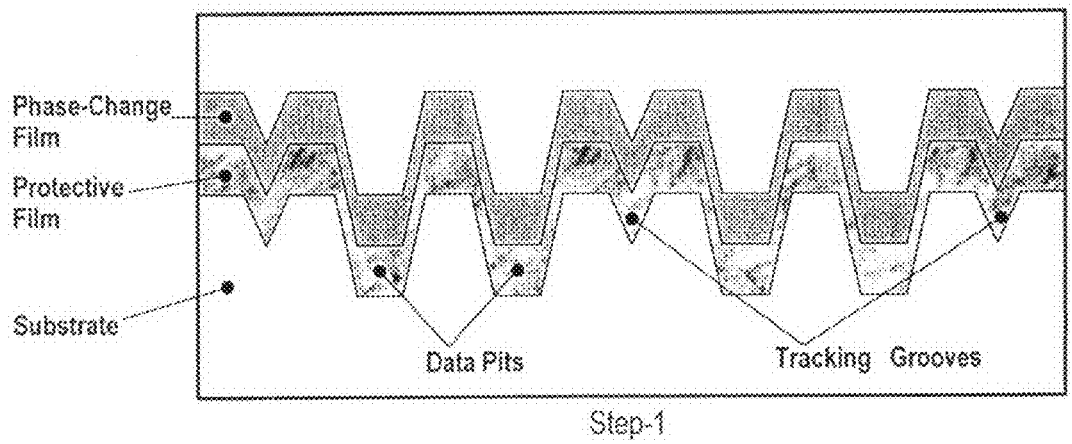
FIGS. 8A to 8C are views illustrating a cross-sectional configuration of the optical disc medium of the present invention and a process method thereof.
Figure 8:
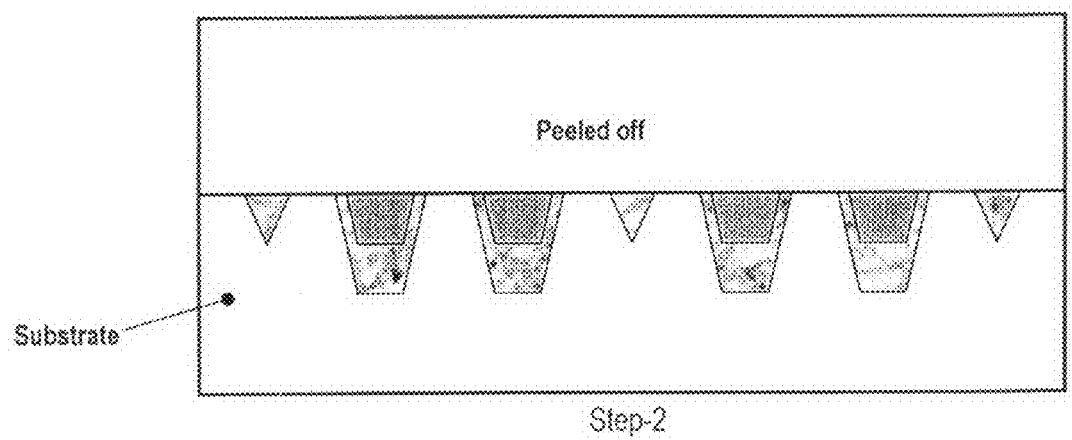
Figure 8:
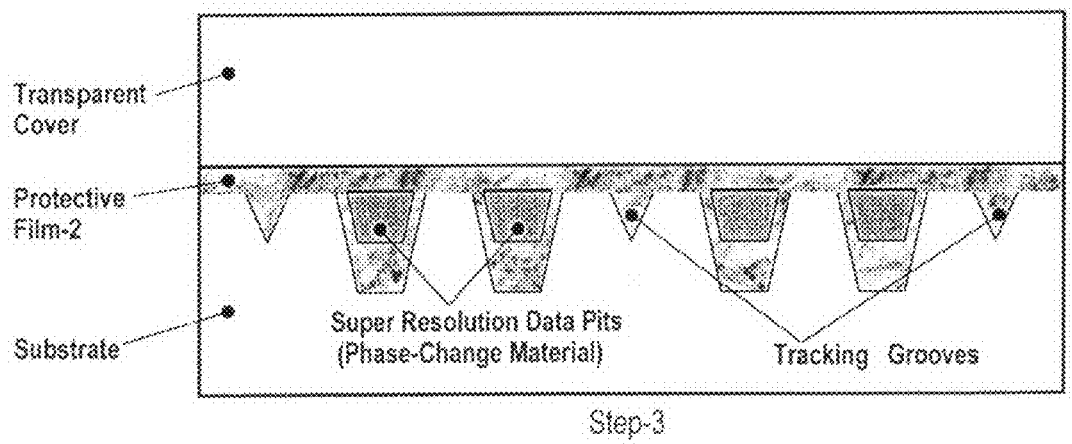

In order to solve the above problem, a configuration and processing steps shown in FIGS. 8A to 8C may be used. In FIGS. 8A to 8C, the track guide groove has what is termed as a V-groove structure. The V-groove structure is a structure which is put to practical use in a magnetic-optical disc. In the V-groove structure, track guide grooves are narrowed, and a land portion which records a magnetic-optical signal is widened in order to prevent deterioration in quality of the magnetic-optical signal due to an influence of the track guide grooves. Here, an employed substrate is that which has a pit string serving as multiple data tracks, and which is formed between the track guide grooves each with a V-groove structure. Accordingly, the technique for forming pits and grooves, each of which has a depth different from that of one another in one substrate has already been put to practical use in the form of guide grooves and sector address pits of the aforementioned magnetic-optical disc or in the form of a data area and a control data area of DVD-RW. These track guide grooves and data pits are formed by changing mainly recording power and a pulse width of a cutting machine. Such technique may be applied to substrate manufacturing.

FIG. 8A schematically shows a cross-sectional structure of a disc of a case where a protective film and a phase-change film are formed on a substrate. FIG. 8B shows a configuration in a state after a flatting process is carried out using the CMP processing. The disc undergoes the CMP processing by use of a groove depth difference between the guide groove and the data pit. Thereby, a phase-change recording film can be left only in the data pit. FIG. 8C shows a cross-sectional structure of a finished disc with a protective film and a transparent cover layer formed thereon. Recording film is not formed on the track guide grooves, and the pitch between the track guide grooves is widely formed to obtain a stable push-pull signal. In addition, multiple data tracks are provided between the track guide grooves. Thereby, this makes it possible to improve data track density. According to this structure, since the phase-change recording film is not formed on the track guide grooves, it is needless to say that large diffraction occurs, and that a good push-pull signal can be obtained.

Figure 9:
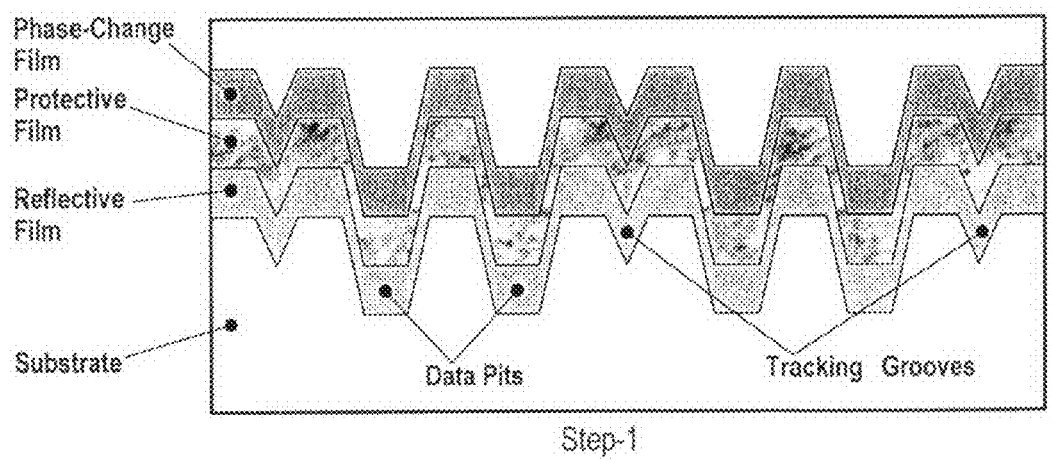
FIGS. 9A to 9C are views illustrating a cross-sectional configuration of the optical disc medium of the present invention and a process method thereof.
Figure 9:
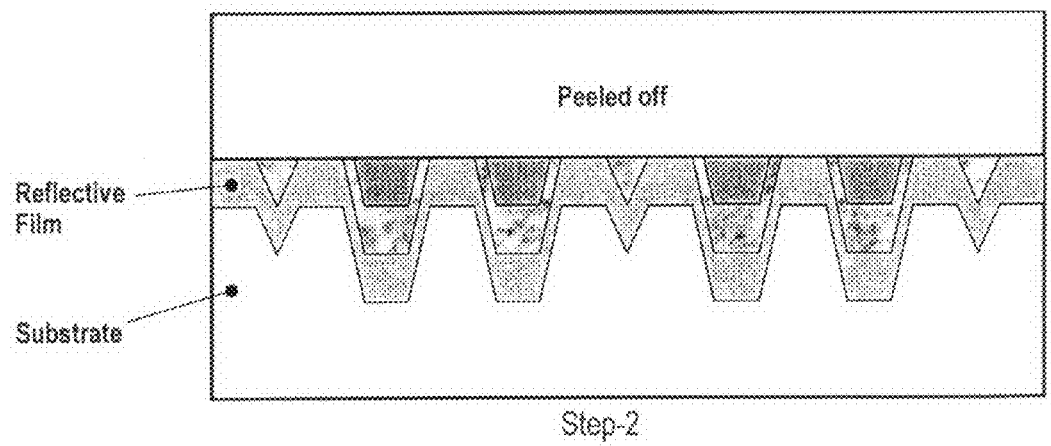
Figure 9:
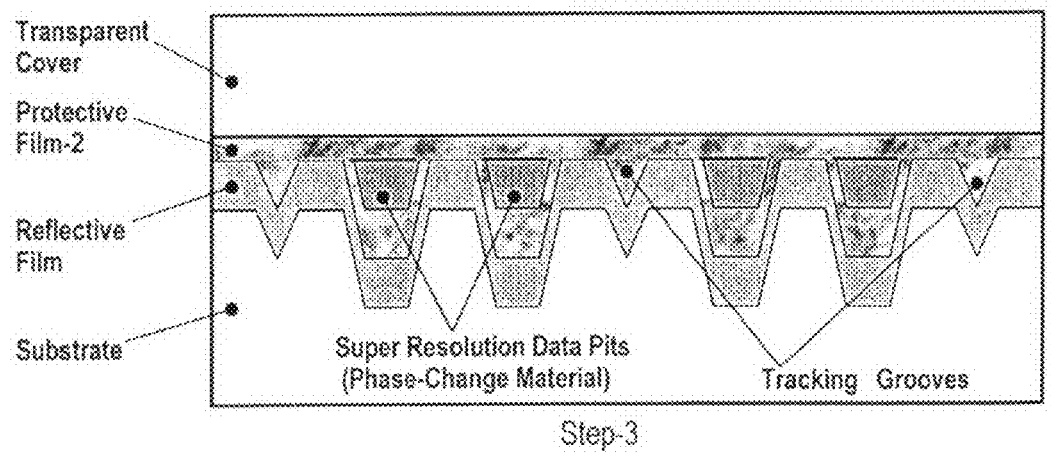

FIG. 9 illustrates a cross-sectional structure of the disc of a case where a reflective film is formed in a space portion. A normal resolution cancel structure can be achieved by controlling reflectivity of the reflective film of the space portion and of the recording mark (pit), and an optical phase thereof. At this time, since light diffraction due to data tracks reduces quality of the push-pull signal from the guide grooves, the normal resolution cancel structure of type 1 is preferably used. However, it is also important to consider selecting the structure of type 2 according to a process margin for medium manufacture and to quality of a super resolution readout signal, the structure of type 2 using a phase difference in a range where stable track control can be achieved.

With regard to a disc configuration of FIG. 9, descriptions will be provided for the main point of implementing normal resolution cancel structures of type 1 and type 2. Regarding type 1, as in the basic concept shown in FIG. 2, the reflectivity of the mark in a crystalline state and that of the space portion are made equal to each other, and a phase difference therebetween is set at zero. In a case of the configuration of FIG. 9, the reflectivity of the mark in a crystalline sate can be controlled independently of the reflectivity of the space portion mainly by a thickness of the phase-change film. This can be easily understood since the phase-change film is not formed in the space portion. As a material composition for a phase-change film to be used, it is possible to select In, Sb, and the like, which are low-melting metals, in addition to GeSbTe alloy, AgInSbTe alloy, GeTe alloy, and SbTe alloy. The phase-change material mentioned in the present invention is used as a generic name for thin film materials having characteristics that an optical constant of the material is different between a solid phase and a liquid phase, that crystallizing speed is sufficiently high, and that crystallization occurs instantly when the phase returns to the solid phase from the liquid phase. The thicknesses of these thin film materials are in the range of about 50 nm or less, and their reflectivity increases approximately in proportion to the film thickness. Thus, it is possible to control the reflectivity of the crystallized mark by design of film thickness. Likewise, it is possible to control reflectivity of the space portion by the thickness of the reflective film material.

Regarding the phase of the mark portion, the thickness of the protective film of the mark portion is controlled. Thereby, the relative position of the reflective film of the space portion and that of the phase-change film of the mark portion can be controlled. At this time, if the pit to be formed on the substrate is too shallow, the range of phase control of the mark portion due to the thickness of the protective film is narrowed. For this reason, the depth of the pit may be set to be about the same as the sum of the thickness of the protective film and that of the recording film. On the basis of an instruction for controlling the reflectivity and phase, with the film configuration of type 1 as a reference, for example, the thickness of the recording film is increased, and that of the protective film is reduced to increase the reflectivity of the crystallized mark higher than that of the space. In addition, the disc structure of type 2 can be obtained by appropriately setting the phase difference between the mark and the space.

Which of types 1 and 2 is suitable for a structure depends on the selected thin film material. For instance, in a case of using the phase-change film with a large change in reflectivity between its crystalline state and molten state, the structure of type 1 which obtains a super resolution signal based on a difference in reflectivity, is suitably used. In a case of using the phase-change film with a large change in phase therebetween, the structure of type 2, which obtains a super resolution signal based on a difference in phase, is suitably used.

Hereinbelow, descriptions will be provided in detail for an embodiment of the present invention.

Figure 1:
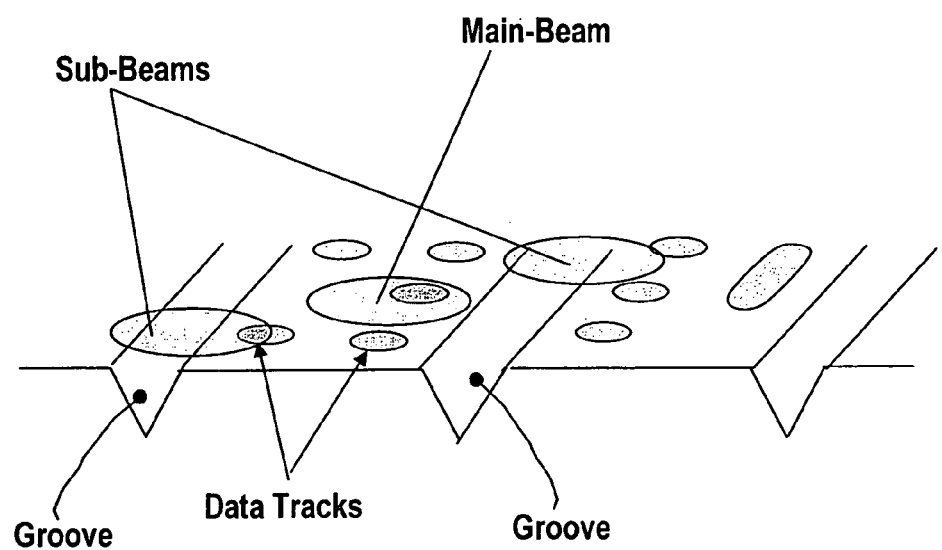
FIG. 1 is a view illustrating a track configuration example of an optical disc medium of the present invention.

FIG. 1 is a view illustrating a track configuration example of an optical disc medium of the present invention. By forming multiple super resolution data tracks between guide grooves, it is possible to implement stable tracking control and high density of data tracks. A layer-change recording film is buried only in the mark portion of the data track and there is no layer-change recording film, which responds to super resolution, on the guide grooves. In a case of considering high-speed access to the data track and expansion to a record type disc medium, the guide grooves are wobbled in a radial direction to allow a clock signal and address data to be buried. A configuration of the corresponding optical disc device will be described later.

In order to implement a storage capacity of 100 GB on one side of an optical disc medium with a diameter of 120 mm, a configuration which may be used is that in which two data tracks are arranged in a track guide groove with a pitch of 320 nm where a length of a shortest mark 2T is 75 nm, by using, for example, the same logic format and modulation code as those of BD. In a case of reading the above optical disc medium by a BD optical system, since an objective lens with wavelength $\lambda=405$ nm and a numerical aperture NA=0.85 is used, optical resolution (mark length at which amplitude is zero) is $\lambda/NA/4=119$ mm, and amplitude of a shortest mark 2T is zero at the time of normal resolution reading. However, with the disc medium of the present invention, in which phase-change materials are arranged only in the mark, it is possible to selectively melt only the phase-change material in the mark at a central portion of a beam spot. Thereby, signal amplitude can be obtained by a super resolution effect. Moreover, since the aforementioned super resolution effect, which uses a spot density distribution, acts in a track width direction in the similar manner, reading power is fixed to such an appropriate value that a mark of an adjacent track placed at a position shifted from a center of the beam spot would not melt. Accordingly, it is possible to obtain a good readout signal without being affected by crosstalk from the adjacent track even under a narrow track condition.

Figure 10:
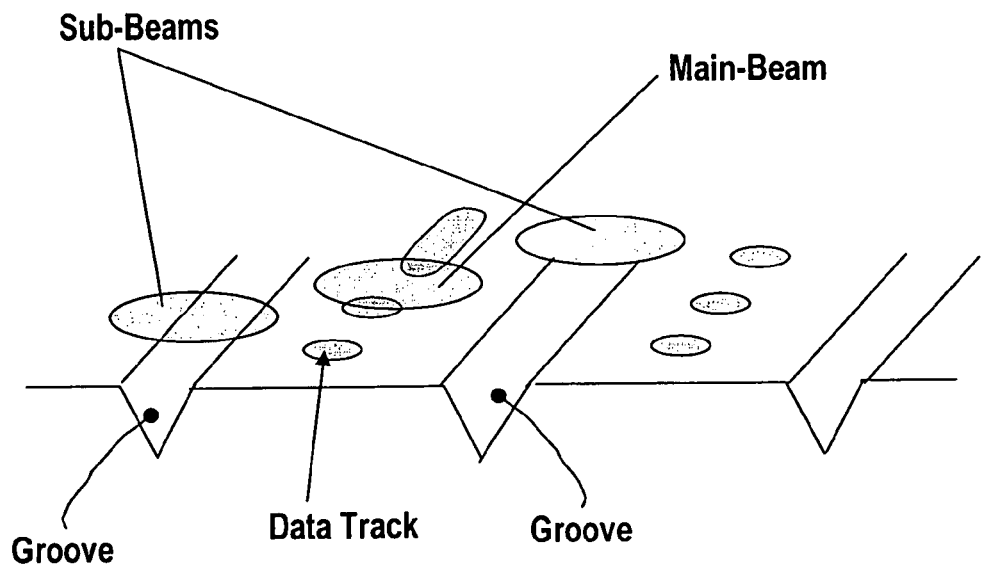
FIG. 10 is a view illustrating a track configuration example of the optical disc medium of the present invention.

FIG. 10 is a view illustrating another track configuration example of the optical disc medium of the present invention. This example shows a case where one data track is provided between the guide grooves. As compared with the configuration in FIG. 1, this example has a feature that the data track can be read by the conventional optical disc drive because the number of data tracks provided between the guide grooves is only one.

When the optical disc media of the present invention as in FIGS. 1 and 10 are used, the number of data tracks between the track guide grooves is changed. Thereby, this makes it possible to provide an optical disc medium having a different capacity in the same data format, and to offer a next generation optical memory system in accordance with the user's needs and the circumstance of the technical development.

Figure 11:
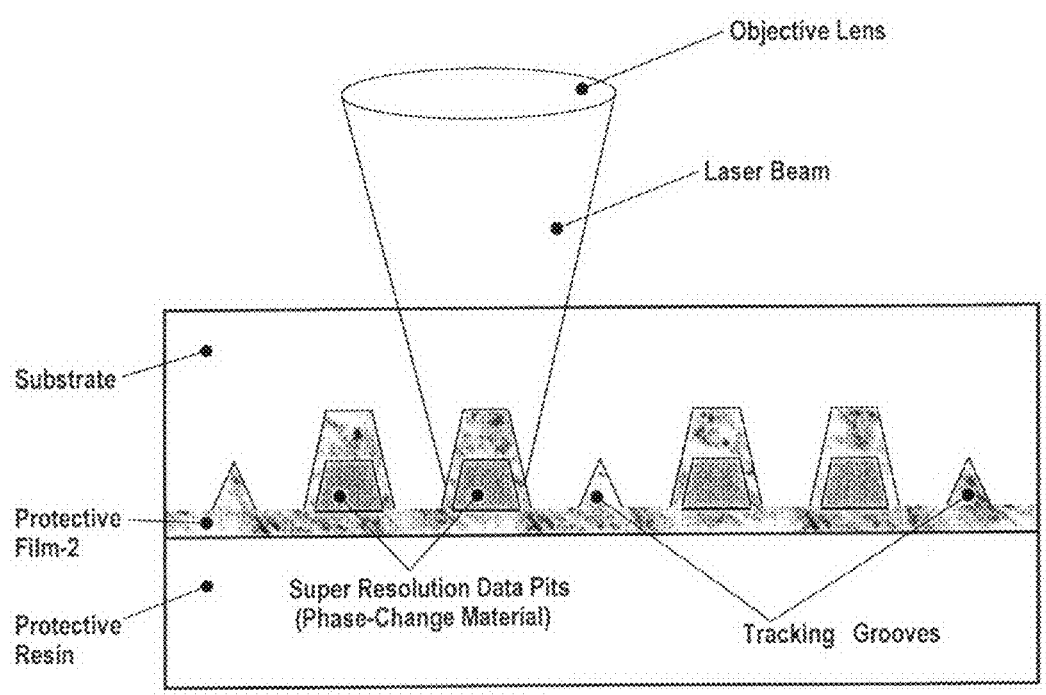
FIG. 11 is a view illustrating a configuration of the optical disc medium of the present invention.

FIG. 11 is a view illustrating a configuration example of the optical disc medium of the present invention provided for an optical system by which a light beam is incident upon a substrate. The optical disc medium provided for the BD optical system has already been mentioned. The optical disc medium of this embodiment allows incidence of the light beam upon the substrate. The basic disc configuration is the same as that of the aforementioned disc, and a difference therebetween lies in the point where a protective resin layer is formed at the end, instead of the transparent cover layer.

Figure 12:
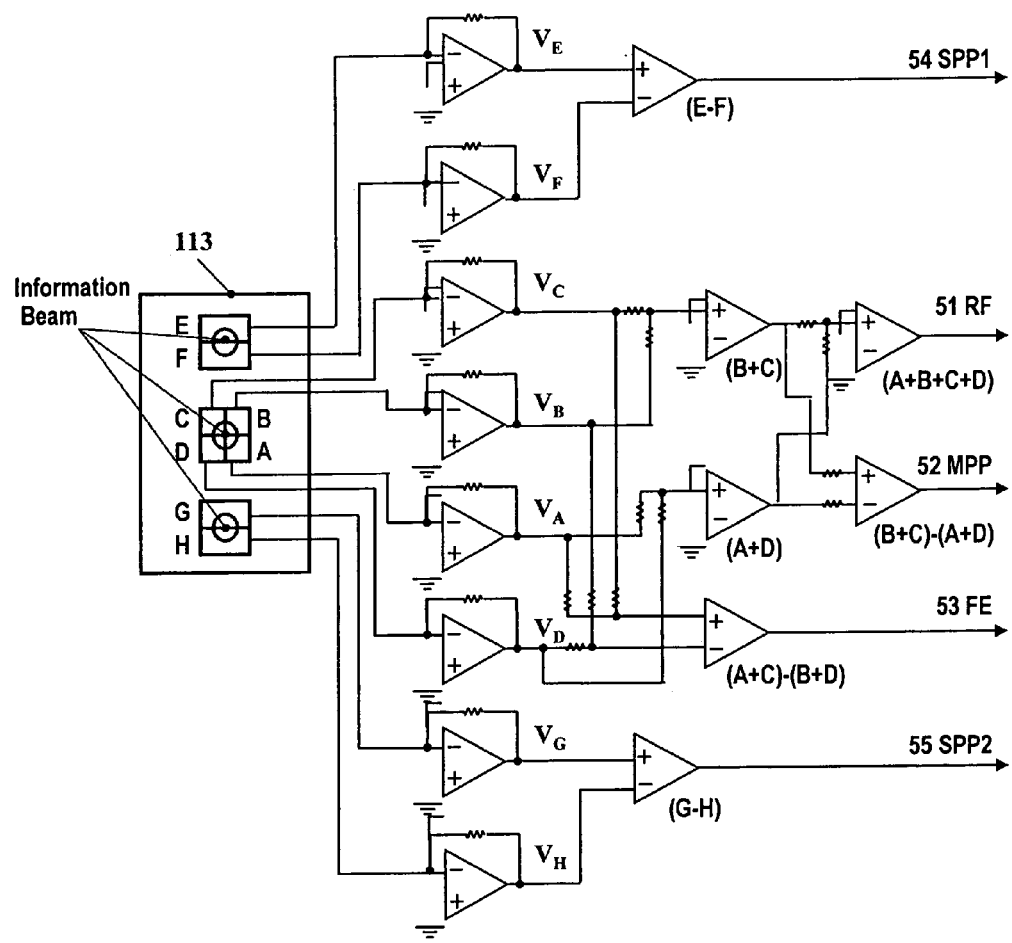
FIG. 12 is a view illustrating a photodetector with a three-beam optical head which allows a DPP type tracking, and its detection signal.

An explanation will be next given of an embodiment of an optical disc device of the present invention. FIG. 12 is a view illustrating a generally-used photodetector with a three-beam light head that allows DPP type tracking, and its detection signal. A photodetector 113 is composed of a four-division detector (A, B, C, D) for a main beam and two two-division detectors (E, F; G, H) for sub-beam. Each beam is converted into a voltage signal via an I-V conversion amplifier, and then a RF signal 51 for data readout, a push-pull signal 52 for a main beam, an anastigmatic focus error signal 53, and push-pull signals 54 and 55 for a sub beam are generated. In the general optical disc device, two-division detectors for sub-beam are often electrically connected to each other directly as in (E+G) and (F+H) respectively to generate a push-pull signal for a sum of sub-beams in order to reduce a circuit scale. Meanwhile, each push-pull signal as an independent electric signal needs to be extracted from the optical disc device of the present invention in order to read a wobble signal. In a case of the optical system corresponding to BD, a semiconductor laser with a wavelength of 405 nm and a numerical aperture of an objective lens (not shown) with a numerical aperture of 0.85 may be employed as a light source to be used.

Figure 18:
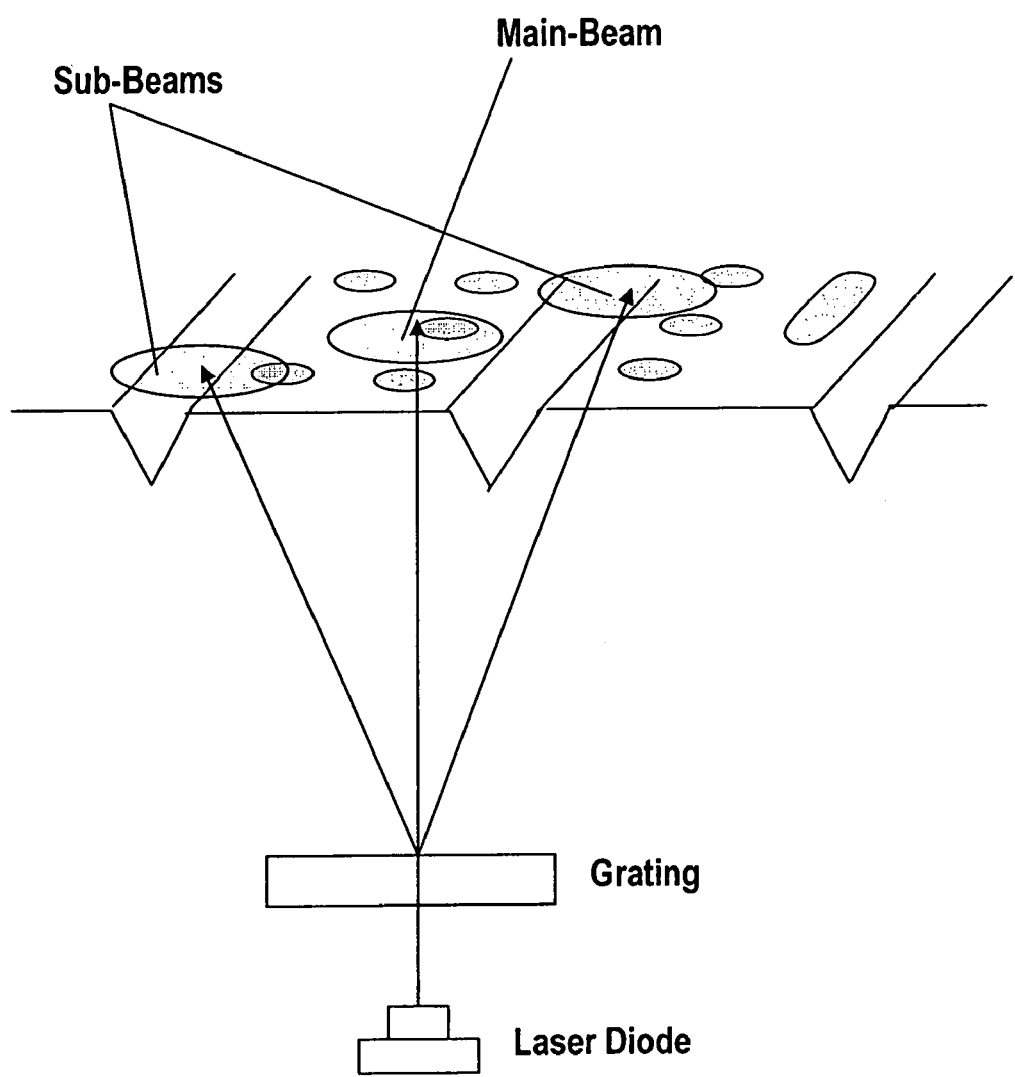
FIG. 18 is an explanatory view of a three-beam generation method.

A brief explanation will be given of a method for generating three beams from one semiconductor laser beam source to form a beam spot. FIG. 18 is a schematic view of a method using a diffraction grating. A laser beam emitted from a semiconductor laser is divided into three beams at angles of 0 and ±1 orders of diffraction when transmitted through the diffraction grating with pitches formed at equal distances. By using such an optical system that 0-order diffraction light is made to correspond to a main spot, and that +1-order diffraction light and −1-order diffraction light are made to correspond to sub-spots respectively, three beam spots can be easily formed on the disc. This method is one that is widely and generally used in the optical disc device.

Figure 13:
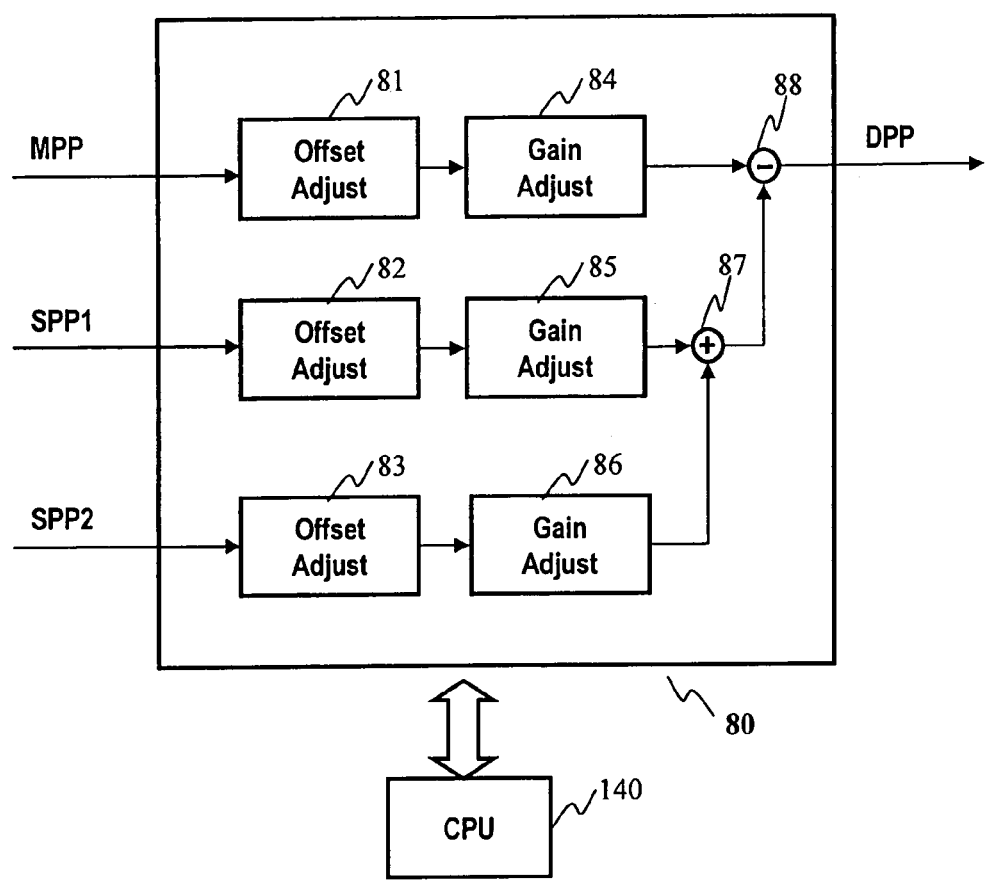
FIG. 13 is a view illustrating a configuration example of a track error signal generation circuit which generates a DPP signal.

FIG. 13 is a view illustrating a configuration example of a track error signal generation circuit which generates a DPP signal. A track error signal generation circuit 80 is composed of offset adjustment circuits 81 to 83, gain adjustment circuits 84 to 86, an adder 87 for a sub-beam push-pull signal, and a subtractor 88 for generating a DPP signal. In the main circuit, a push-pull signal MPP for the main beam and two push-pull signals SPP1 and SPP2 for the sub-beams are used to perform offset adjustment and gain adjustment for each of these signals. Thereafter, a DPP signal as (MPP−SPP) is calculated. At this time, offset adjustment and gain adjustment are controlled by an instruction from a CPU 140. A generated DPP signal is used for tracking control.

Figure 14:
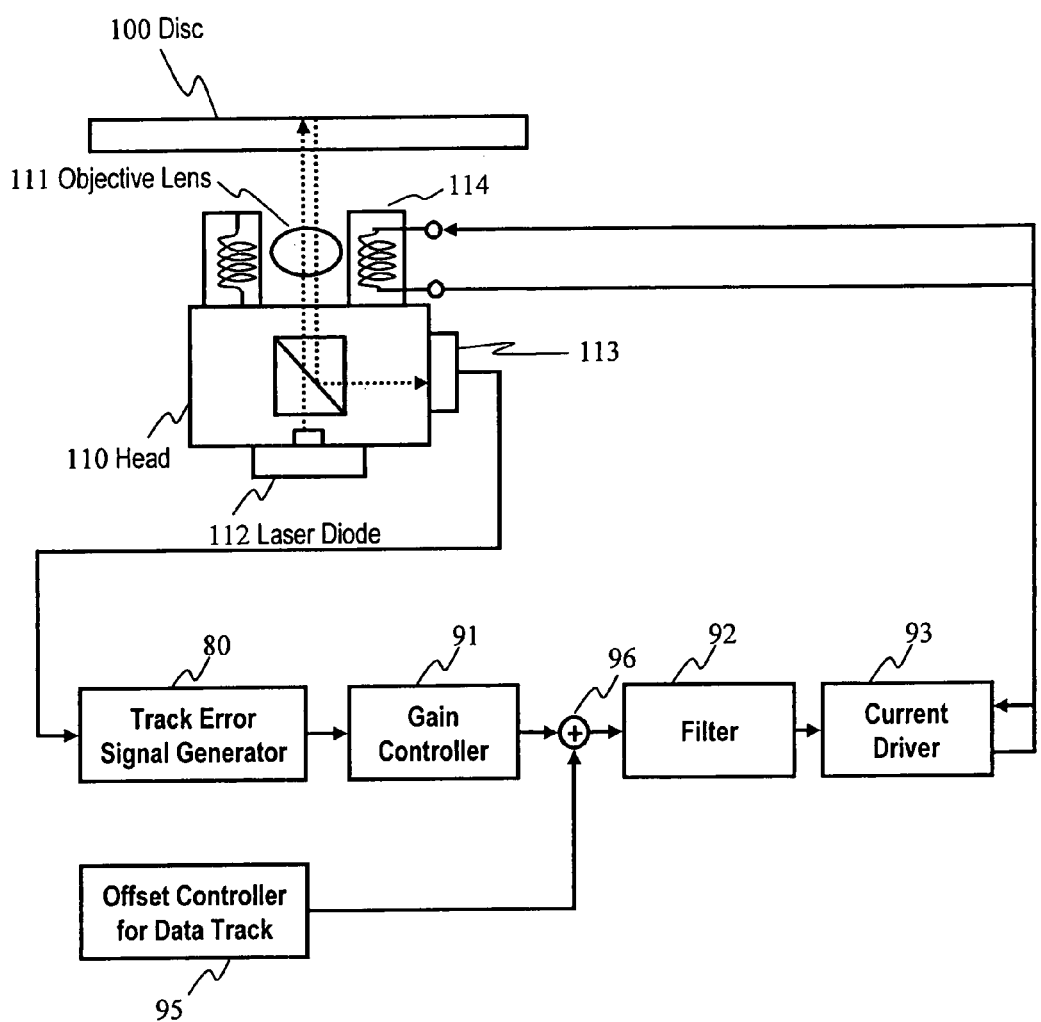
FIG. 14 is a view illustrating a configuration example of a tracking control circuit of the optical disc device of the present invention.

FIG. 14 is a block diagram illustrating a configuration example of a tracking control circuit of the optical disc device of the present invention. In FIG. 14, a reflected light detected by the photodetector 113 is converted into an electric signal. Thereafter, the reflected light is sent to the track error signal generation circuit 80 to generate a DPP signal. The DPP signal is passed through a servo gain control circuit 91, a phase filter 92, and a current driver 93 to control an objective lens actuator 114. Thereby, tracking control is implemented. In the optical disc medium of the present invention, multiple data tracks are formed between the track guide grooves. In order to correspond to these data tracks, an offset control circuit 95 generates the amount of track offset corresponding to a designated data track to add the generated amount of track offset to a tracking control loop by an adder 96. Thereby, readout of a predetermined data track is implemented.

Figure 15:
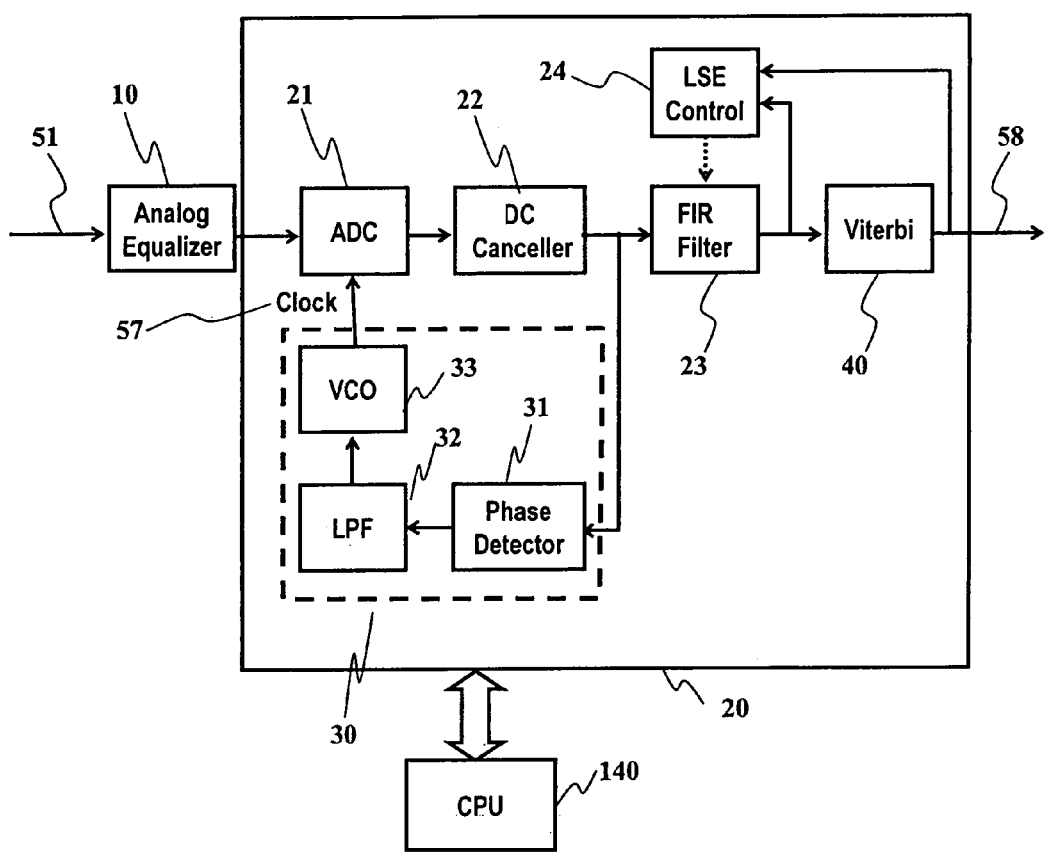
FIG. 15 is a view illustrating a configuration example of a data readout circuit suitable for the optical disc device of the present invention.

FIG. 15 is a view illustrating a configuration example of a data readout circuit appropriate for the optical disc device of the present invention. In an analog equalizer 10, a RF signal 51 detected by an optical head (not shown) is subjected to equalization and AGC. Thereafter, the RF signal is input to a digital signal processing section 20. In the digital signal processing section 20, the input RF signal is converted into a digital signal by an AD converter 21 at every clock. Thereafter, the RF signal is subjected to CD cancellation by a DC canceller 22. Then, the resultant signal is digital equalized by an FIR filter 23, and is binarized by a Viterbi decoder 40 to be taken out as a binary output 58. Although not specifically described to prevent the present invention from exceeding the scope of the invention, an internal structure of the Viterbi decoder 40 is intended to compare a readout signal with a target signal generated by a convolution of a binary bit string and PR class, and to sequentially select each binary bit string at which an error therebetween reaches the minimum. Learning process of tap coefficients of the FIR filter is carried out by an LSE control section 24. A PLL (Phase Locked Loop) circuit 30 which generates a clock signal is composed of a phase detector 31, a low-pass filter 33, and a VCO (Voltage Controlled Oscillator) 34. By the aforementioned configuration, it is possible to obtain the binary data 58 from the RF signal 51. The binary data 58 is input to a logic format decoder (not shown). Thereby, data which is processed to be demodulated, and which is then recorded on an optical disc medium can be read.

Figure 16:
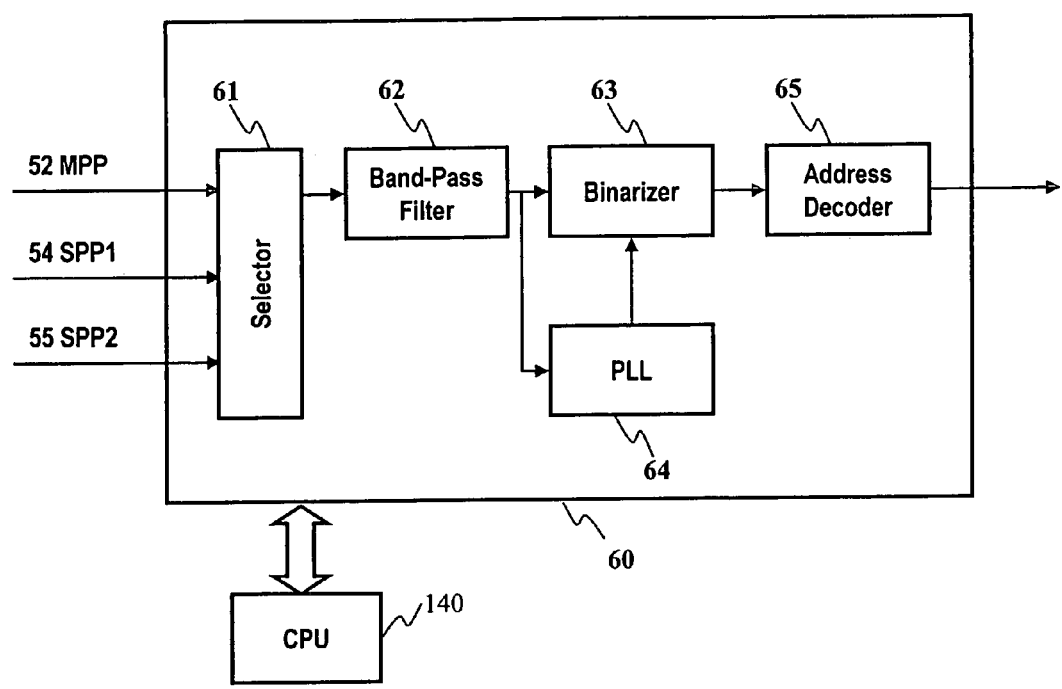
FIG. 16 is a view illustrating a configuration example of a wobble data readout circuit.

FIG. 16 is a view illustrating a configuration example of a circuit for reading wobble data from the optical disc medium of the present invention. In the general record type optical discs, the data marks are recorded and read on the guided grooves. Accordingly, a wobble signal is generated from a push-pull signal MPP 52 for the main beam. On the other hand, in the optical disc medium of the present invention, a beam which scans on the guide grooves is a sub-beam. Hence, a push-pull signal SPP1 or SPP2 of the sub-beam is used to read wobble data from the optical disc medium of the present invention. In the optical disc device which are provided for the conventional optical disc and for the large-capacity optical disc of the present invention, a selector 61, which selects a wobble signal to be used, is needed. A wobble signal processing circuit 60 of the present invention is composed of a selector 61, a band-pass filter 62, a binarizer 63, a PLL circuit 64, and an address decoder 65. Although not specifically described to prevent the present invention from exceeding the scope of the invention, the principle of reading address data from the wobble signal is basically that: the PLL circuit 64 generates a clock from a wobble signal in which a modulation signal is superimposed on a sinusoidal signal; the binarizer 63 binarizes data using the generated clock; and address information is obtained by the address decoder 65 according to a predetermined decoding rule. Operation control of the wobble signal processing circuit 60 is carried out by the CPU 140.

Figure 17:
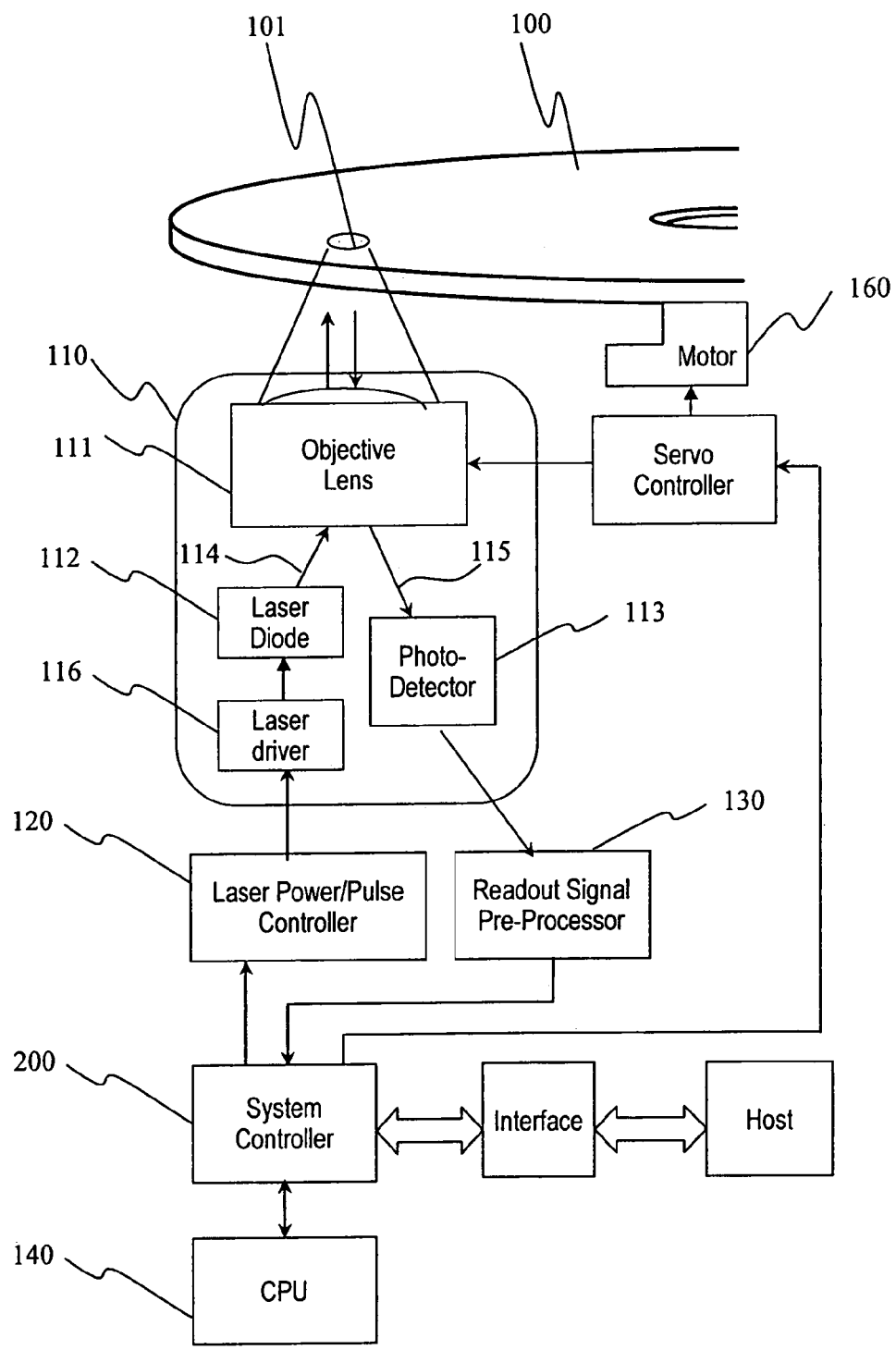
FIG. 17 is a schematic view illustrating a configuration example of the optical disc device.

FIG. 17 is a schematic view illustrating a configuration example of an optical disc device of the present invention. An optical disc medium 100 mounted on the device is rotated by a spindle motor 160. At the time of readout, a laser power/pulse controller 120 controls current to be supplied to a semiconductor laser 112 via a laser driver 116 in an optical head 110 to generate a laser beam 114 so that light intensity instructed by the CPU 140 can be obtained. The laser beam 114 is condensed with an objective lens 111 to form a beam spot 101 on the optical disc medium 100. A reflected light 115 from the beam spot 101 is detected through the objective lens 111 by the photodetector 113. The photodetector is composed of a plurality of divided photodetection elements. A readout signal processing circuit 130 reads information recorded on the optical medium 100 by using a signal detected by the optical head 110. The track error signal generation circuit, the tracking control circuit, the data readout circuit, and the wobble signal processing circuit of the present invention are incorporated into a system control circuit 200. The foregoing configuration enables the optical disc device of the present invention to implement data readout and wobble address readout from the optical disc medium of the present invention, and tracking control thereof. The aforementioned configuration makes it possible to provide the optical disc device of the present invention.

The present invention can be used in the large-capacity optical disc medium which makes use of a super resolution effect, and its corresponding optical disc device.

What is claimed is:

1. An optical disc medium comprising:
   a substrate;
   track guide grooves formed on a surface of the substrate;
   a data track provided in a region between adjacent track guide grooves on the surface of the substrate; and
   data pits formed in the data track,
   wherein a material having an optical characteristic which changes according to a power of an irradiating light beam is buried only in the data pits of the data track provided between the adjacent track guide grooves.

2. The optical disc medium according to claim 1, wherein:
   an amount of reflected light from the data pits is substantially equal to an amount of reflected light of a region between data pits when the power of the irradiating light beam is a first power, and
   an amount of reflected light from the data pits is different from the amount of reflected light of the region between the data pits when the power of the irradiating light beam is a second power which is higher than the first power.

3. The optical disc medium according to claim 1, wherein a plurality of data tracks are formed in the region between the adjacent track guide grooves.

4. The optical disc medium according to claim 1, wherein the track guide grooves each has a V-groove structure.

5. The optical disc medium according to claim 1, further comprising:
   a protective film deposited on the entire surface of the substrate to cover the track guide grooves, and the data tracks between the adjacent track guide grooves each including the data pits formed therein; and
   a transparent film formed on the protective film.

6. An optical recording medium comprising:
   a substrate;
   track guide grooves formed on a surface of the substrate;
   one or more data tracks provided in a region between adjacent track guide grooves on the surface of the substrate;
   data pits formed in each data track; and
   a phase-change recording film buried only in the data pits of each data track provided between the adjacent track guide grooves,
   wherein the phase-change recording film is formed of material having an optical characteristic which changes according to a power of an irradiating light beam.

7. The optical recording medium according to claim 6, wherein:
   when the power of the irradiating light beam is a first power, an amount of light reflected from the data pits is substantially equal to an amount of light reflected from a region between the data pits; and
   when the power of the irradiating light beam is a second power higher than the first power, the amount of light reflected from the data pits is different from the amount of light reflected from the region between the data pits.

8. The optical recording medium according to claim 6, wherein the track guide grooves each has a V-groove structure.

9. The optical recording medium according to claim 6, further comprising:
   a protective film deposited on the entire surface of the substrate to cover the track guide grooves, and the data tracks between the adjacent track guide grooves each including the data pits formed therein; and
   a transparent film formed on the protective film.

* * * * *